(12) United States Patent
Petzl et al.

(10) Patent No.: US 8,069,810 B2
(45) Date of Patent: Dec. 6, 2011

(54) ATTACHMENT DEVICE EQUIPPED WITH A WHISTLE

(75) Inventors: Paul Petzl, Barraux (FR); Stephane Huguenin, Grenoble (FR); Nicolas Flores, Echirolles (FR)

(73) Assignee: Zedel, Crolles (FR)

( * ) Notice: Subject to any disclaimer, the term of this patent is extended or adjusted under 35 U.S.C. 154(b) by 313 days.

(21) Appl. No.: 12/320,264

(22) Filed: Jan. 22, 2009

(65) Prior Publication Data

US 2009/0193630 A1    Aug. 6, 2009

(30) Foreign Application Priority Data

Feb. 6, 2008    (FR) .................................... 08 00612

(51) Int. Cl.
    *G01K 5/00*    (2006.01)

(52) U.S. Cl. .................. 116/137 R; 24/115 G; 24/3.2

(58) Field of Classification Search ............. 116/137 R, 116/140; 24/3.2, 3.11, 115 G
    See application file for complete search history.

(56) References Cited

U.S. PATENT DOCUMENTS

| | | | | |
|---|---|---|---|---|
| D25,238 S | * | 3/1896 | Abell ............................. | D10/119 |
| 691,364 A | * | 1/1902 | Denckla ........................ | 24/3.2 |
| 1,213,102 A | * | 1/1917 | Hill ................................ | 24/3.2 |
| 1,407,239 A | * | 2/1922 | Weiss ............................. | 281/51 |
| 2,176,052 A | * | 10/1939 | Beyer ............................ | 132/331 |
| 3,550,824 A | * | 12/1970 | Bohanski ...................... | 224/197 |
| 3,627,182 A | * | 12/1971 | Calkins ......................... | 224/584 |
| 4,733,808 A | * | 3/1988 | Turner et al. .................. | 224/219 |
| 4,880,152 A | * | 11/1989 | Trankle ......................... | 224/162 |
| 4,958,758 A | * | 9/1990 | Tipple et al. .................. | 224/267 |
| D347,589 S | * | 6/1994 | LaBate .......................... | D10/74 |
| 5,803,785 A | * | 9/1998 | Primos et al. ................. | 446/207 |
| 6,109,490 A | * | 8/2000 | Caluori ......................... | 224/220 |
| 6,161,314 A | * | 12/2000 | Kamrin ......................... | 36/112 |
| 6,233,788 B1 | * | 5/2001 | Choy et al. ................... | 24/3.12 |
| 6,282,802 B1 | * | 9/2001 | Iden ............................... | 33/348 |
| 6,360,928 B1 | * | 3/2002 | Russo ............................ | 224/218 |
| 6,416,379 B1 | * | 7/2002 | Topman ........................ | 446/204 |
| 6,502,283 B1 | * | 1/2003 | Aguirre ......................... | 24/3.11 |
| 6,668,428 B2 | * | 12/2003 | Moeller ......................... | 24/163 R |
| 7,043,802 B2 | * | 5/2006 | Moeller et al. ................ | 24/429 |
| 7,159,281 B1 | * | 1/2007 | Irizarry ......................... | 24/3.12 |
| D539,687 S | * | 4/2007 | Chen .............................. | D10/119 |
| 7,722,219 B2 | * | 5/2010 | Hartley ......................... | 362/253 |
| 7,832,606 B2 | * | 11/2010 | Sin ................................. | 224/197 |
| 2009/0094798 A1 | * | 4/2009 | Yao ............................... | 24/115 G |

FOREIGN PATENT DOCUMENTS

| | | |
|---|---|---|
| CA | 2 301 784 A1 | 9/2001 |
| GB | 2 277 351 A | 10/1994 |
| WO | WO 01/78545 A1 | 10/2001 |

* cited by examiner

*Primary Examiner* — R. A. Smith
*Assistant Examiner* — Tania Courson
(74) *Attorney, Agent, or Firm* — Oliff & Berridge, PLC

(57) ABSTRACT

An attachment device with a whistle comprises a securing device of a flexible joining strap and a release button, the assembly being housed in a hollow body made from plastic material. The hollow body is injection molded in a single part being subdivided into a first compartment housing the whistle and a second compartment housing the release button and a securing jaw. The latter is composed of a first jamming surface integral to the movable release button and a fixed second jamming surface molded together with the body, said part being open molded by means of a stop valve joined to the body of the compartment by a hinge.

8 Claims, 2 Drawing Sheets

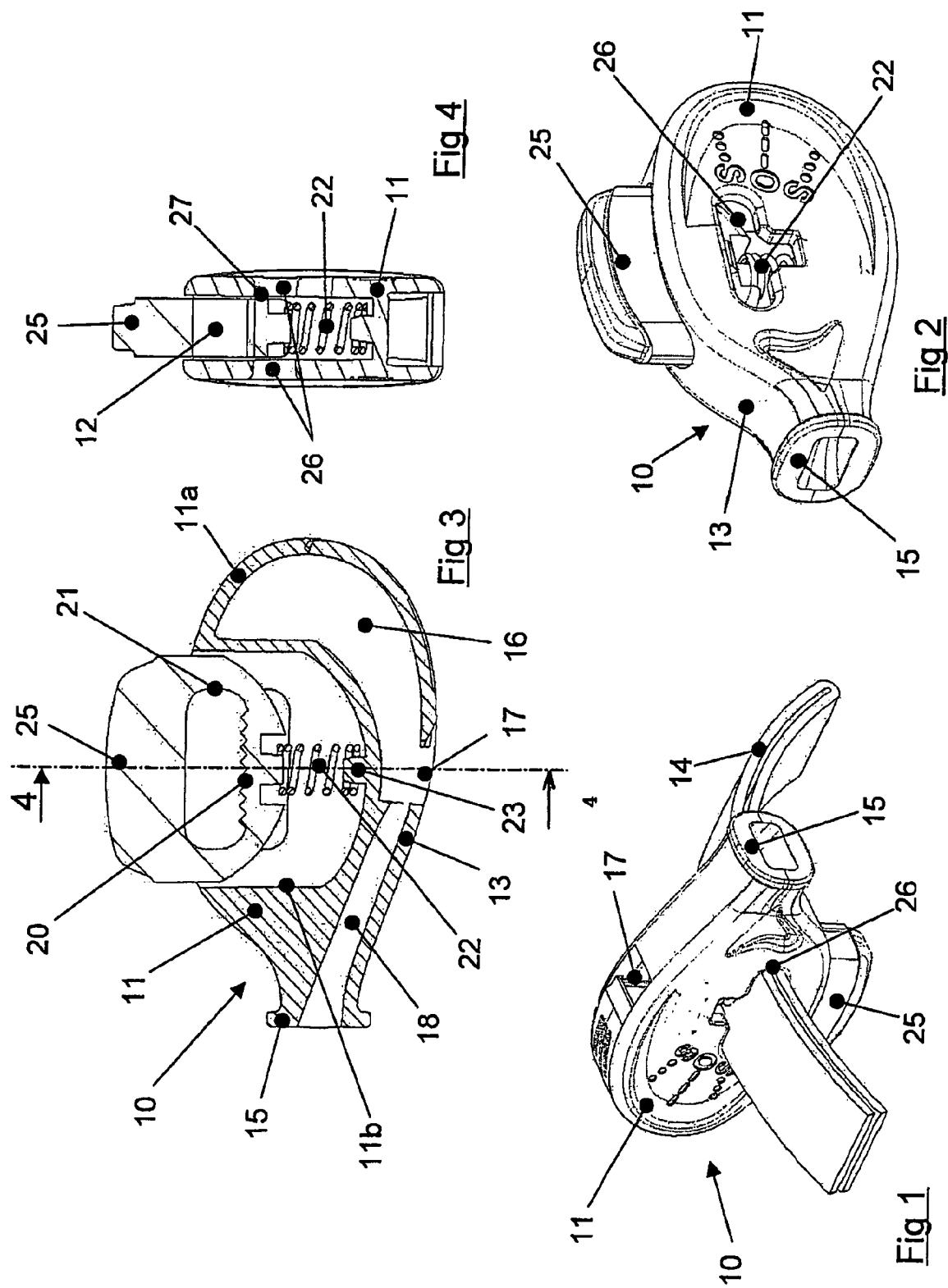

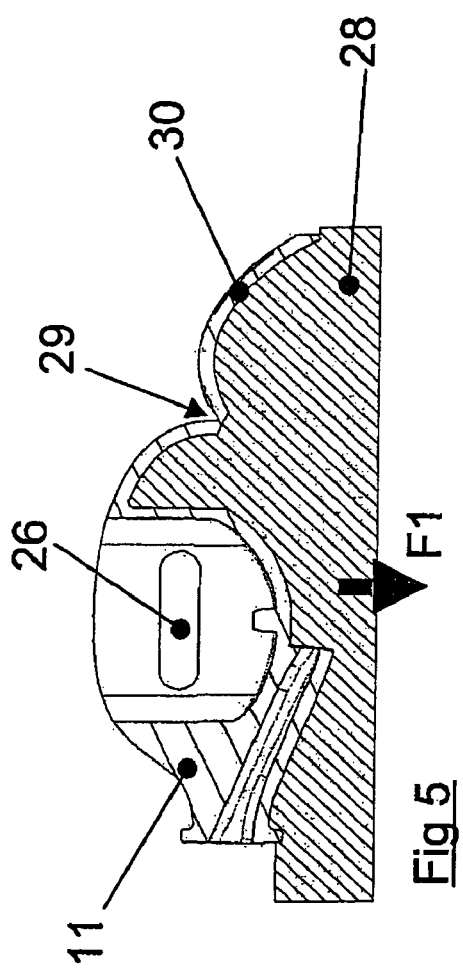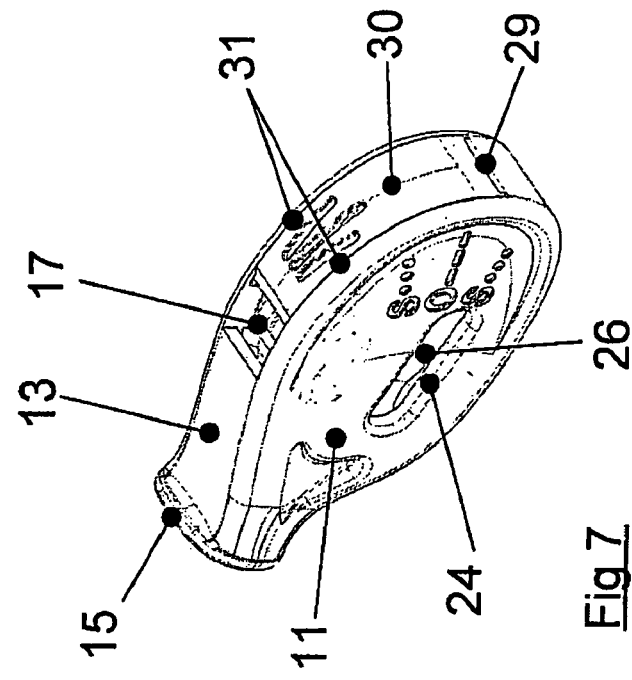

ATTACHMENT DEVICE EQUIPPED WITH A WHISTLE

BACKGROUND OF THE INVENTION

The invention relates to an attachment device associated with a whistle and comprising a securing device of a flexible joining means and a release button to release said joining means, the assembly being housed in a hollow body made of plastic material.

STATE OF THE ART

A known attachment device of the kind mentioned concerns an attachment loop for a rucksack, composed of a pair of clip-fixing securing parts equipped with rings for holding the straps and a whistle provided in the body of one of the parts. Injection molding of such a loop is complicated and requires several molds.

OBJECT OF THE INVENTION

The object of the invention consists in providing an attachment device with an integrated whistle that is easy to manufacture and to assemble.

The device according to the invention is characterized in that the hollow body is injection molded in a single part, being subdivided into a first compartment housing the whistle and a second compartment housing the release button and a securing jaw which is composed of a first jamming surface integral to the movable release button and a fixed second jamming surface molded together with the body, said part being open molded by means of a stop valve joined to the body of the first compartment by a hinge.

According to a preferred embodiment, the whistle comprises an outlet vent and a mouthpiece communicating in the first compartment with a resonating chamber formed after the stop valve has been closed. A spring is inserted between the release button and the body to bias the first jamming surface de towards the fixed second jamming surface of the securing jaw. The release button is equipped with a securing means designed to clip onto the body in the inserted position in the second compartment.

The joining means can be formed by a strap, an elastic strip or a cord.

BRIEF DESCRIPTION OF THE DRAWINGS

Other advantages and features will become more clearly apparent from the following description of a particular embodiment of the invention given for non-restrictive example purposes only and represented in the accompanying drawings, in which:

FIG. 1 is a perspective view of the attachment device with a whistle according to the invention, the joining strap being inserted in the securing device;

FIG. 2 shows an identical view to FIG. 1 after the attachment device has been turned;

FIG. 3 represents a vertical cross-sectional view of FIG. 2;

FIG. 4 is a cross-sectional view along the line 4-4 of FIG. 3;

FIG. 5 schematically shows the device for molding the monoblock part of the body of the attachment device;

FIG. 6 represents the body after extraction from the mold and in the open position of the stop valve;

FIG. 7 is an identical view to FIG. 6 after the stop valve has been closed.

DETAILED DESCRIPTION OF THE INVENTION

With reference to FIGS. 1 to 4, an attachment device 10 comprises a hollow body 11 made of molded plastic material comprising a securing device of tanka type 12 and a whistle 13.

Securing device 12 serves the purpose of securing a flexible joining means 14 formed by a strip of elastic fabric, a strap or a cord, and designed to be connected to any object, in particular a portable torch-lamp, a bag, a ski-pole strap, a bonnet, and so forth.

Whistle 13 is arranged in a first compartment 11a of body 11 and is composed of a mouthpiece 15 for blowing into, a resonating chamber 16 and an outlet vent 17. Mouthpiece 15 communicates with resonating chamber 16 via an internal channel 18.

Body 11 houses a second compartment wherein a release button 25 of the tanka is housed. It comprises a securing jaw 19 composed of a first notched jamming surface 20 extending along an oblong opening 21 arranged in button 25, and a compression spring 22 inserted between button 25 and a fixed mounting stud 23. Spring 22 biases first jamming surface 20 towards a fixed second jamming surface 24 of body 11 so as to secure joining means 14. The external part of release button 25 is salient from body 11 due to the action of return spring 22, and a pushing action simply has to be exerted to release joining means 14.

The two jamming surfaces 20, 24 can be smooth or notched.

Vent 17 of whistle 13 is located opposite tanka release button 25 and the side faces of body 11 are equipped with a pair of aligned slots 26 for inserting flexible joining means 14, which can also pass through opening 21 of jaw 19 when pressure is exerted on release button 25 against the return force of spring 22.

Release button 25 is further equipped with a securing prong 27 designed to clip onto an edge of one of slots 26 of body 11 to secure the button in second compartment 11b.

In FIGS. 5 to 7, hollow plastic body 11 of attachment device 10 is injection molded in a single part with the compartments 11a, 11b respectively housing whistle 13 and fixed second jamming surface 24 of securing jaw 19. Mold 28 is represented schematically in FIG. 5, with the direction of extraction F1 enabling the part with a stop valve 30 joined by a hinge 29 to body 11 to be obtained. In FIG. 6, stop valve 30 is open after extraction from the mold, and then simply has to be closed by pivoting in the direction of arrow F2 to obtain whistle vent 17 (FIG. 7). Clips 31 are provided on body 11 to secure stop valve 30 in the closed position.

The plastic part with hinge 29 is open molded and then closed by swivelling stop valve 30. The use of this hinge 29 enables a closed volume to be obtained while at the same time injecting a monoblock part.

Release button 25 with its spring 22 then simply has to be inserted in second compartment 11b after spring 22 has previously been positioned on fixed mounting stud 23 of body 11. At the end of insertion travel, securing prong 27 engages by clipping onto an edge of one of the slots 26 of body 11 to hold button 25 in place. Joining strap 14 can then be inserted transversely in slots 26 and opening 21 by pressing at the same time on release button 25 of the tanka. When the pressing force has been released, strap 14 is automatically held by securing jaw 19.

Whistle 13 is accessible at any time and remains captive due to strap 19 permanently connected to the object.

The invention claimed is:

1. An attachment device with a whistle comprising:
    a securing device of a flexible joining means; and
    a release button to release said joining means, the securing device and release button being housed in a hollow body made from plastic material, wherein:
        the hollow body is injection molded in a single part being sub-divided into a first compartment and a second compartment;
        the first compartment housing the whistle;
        the second compartment housing the release button and a securing jaw which is composed of a first jamming surface integral to the movable release button and a fixed second jamming surface molded together with the body;
        the part being open molded by means of a stop valve joined to the body of the first compartment by a hinge; and
        the whistle comprises an outlet vent arranged in the first compartment and directly opposite the second compartment after the stop valve has been closed.

2. The attachment device according to claim 1, wherein the whistle comprises a mouthpiece communicating in the first compartment with a resonating chamber formed after the stop valve has been closed.

3. The attachment device according to claim 1, wherein a spring is inserted between the release button and the body to bias the first jamming surface towards the fixed second jamming surface of the securing jaw.

4. The attachment device according to claim 1, wherein the vent of the whistle is situated opposite the release button.

5. The attachment device according to claim 1, wherein the release button is equipped with a securing means designed to clip onto the body in an inserted position in the second compartment.

6. The attachment device according to claim 1, wherein side faces of the hollow body are equipped with a pair of slots aligned with the securing jaw when a pressure is exerted on the release button.

7. The attachment device according to claim 1, wherein the joining means are formed by a strap, an elastic strip or a cord.

8. The attachment device according to claim 1, wherein the first and second jamming surfaces can be smooth or notched.

* * * * *